United States Patent [19]
Schwind et al.

[11] Patent Number: 4,674,931
[45] Date of Patent: Jun. 23, 1987

[54] FASTENER WITH PLASTIC U-NUT

[75] Inventors: Richard J. Schwind, Akron, Ohio; Joseph Bart, St. Charles; Burnell Wollar, Barrington, both of Ill.

[73] Assignee: Phillips Plastics Corporation, Phillips, Wis.

[21] Appl. No.: 825,214

[22] Filed: Feb. 3, 1986

[51] Int. Cl.⁴ ............................................. F16B 37/02
[52] U.S. Cl. .................................... 411/175; 411/310; 411/437
[58] Field of Search ............... 411/103, 112, 174, 175, 411/437, 508–510, 512, 310, 311, 908; 249/74.2, 74.3

[56] References Cited

U.S. PATENT DOCUMENTS

| | | | |
|---|---|---|---|
| 4,273,175 | 6/1981 | Capuano | 411/310 |
| 4,396,326 | 8/1983 | McKinnie, III et al. | 411/175 |
| 4,570,303 | 2/1986 | Richmond et al. | 411/437 |
| 4,571,136 | 2/1986 | Peek | 411/512 |

FOREIGN PATENT DOCUMENTS

| | | | |
|---|---|---|---|
| 1521125 | 4/1968 | France | 411/908 |
| 2518195 | 6/1983 | France | 411/908 |

Primary Examiner—Gary L. Smith
Assistant Examiner—Neill Wilson
Attorney, Agent, or Firm—James E. Nilles; Thomas F. Kirby

[57] ABSTRACT

A fastener for securing primary and secondary panels together comprises a molded plastic one-piece U-nut and a molded plastic screw. The nut comprises two plates, each having a plate hole therethrough, which face each other with their plate holes in registry and which are integrally and resiliently interconnected along one edge in spaced apart relationship. One plate supports on its outer side an integrally formed nut shank having an internally threaded bore in registry with the plate holes. The other plate supports on its innerside an integrally formed annular shaped sloped lock tab which surrounds its associated plate hole and holds the nut in place on the primary panel. The bore thread is formed in discrete thread sections and locking teeth are formed on the undersides of the bore thread sections. The screw comprises a threaded screw shank having a screw head at one end. The screw thread has locking teeth formed on the upper side thereof at intervals therealong. In use, the U-nut is slipped onto the edge of the primary panel so that its plate holes and shank bore register with an oversized panel hole inward of the panel edge. The panels are then placed face-to-face and the threaded screw shank is axially inserted through a hole in the secondary panel and through the plate holes in the U-nut.

7 Claims, 9 Drawing Figures

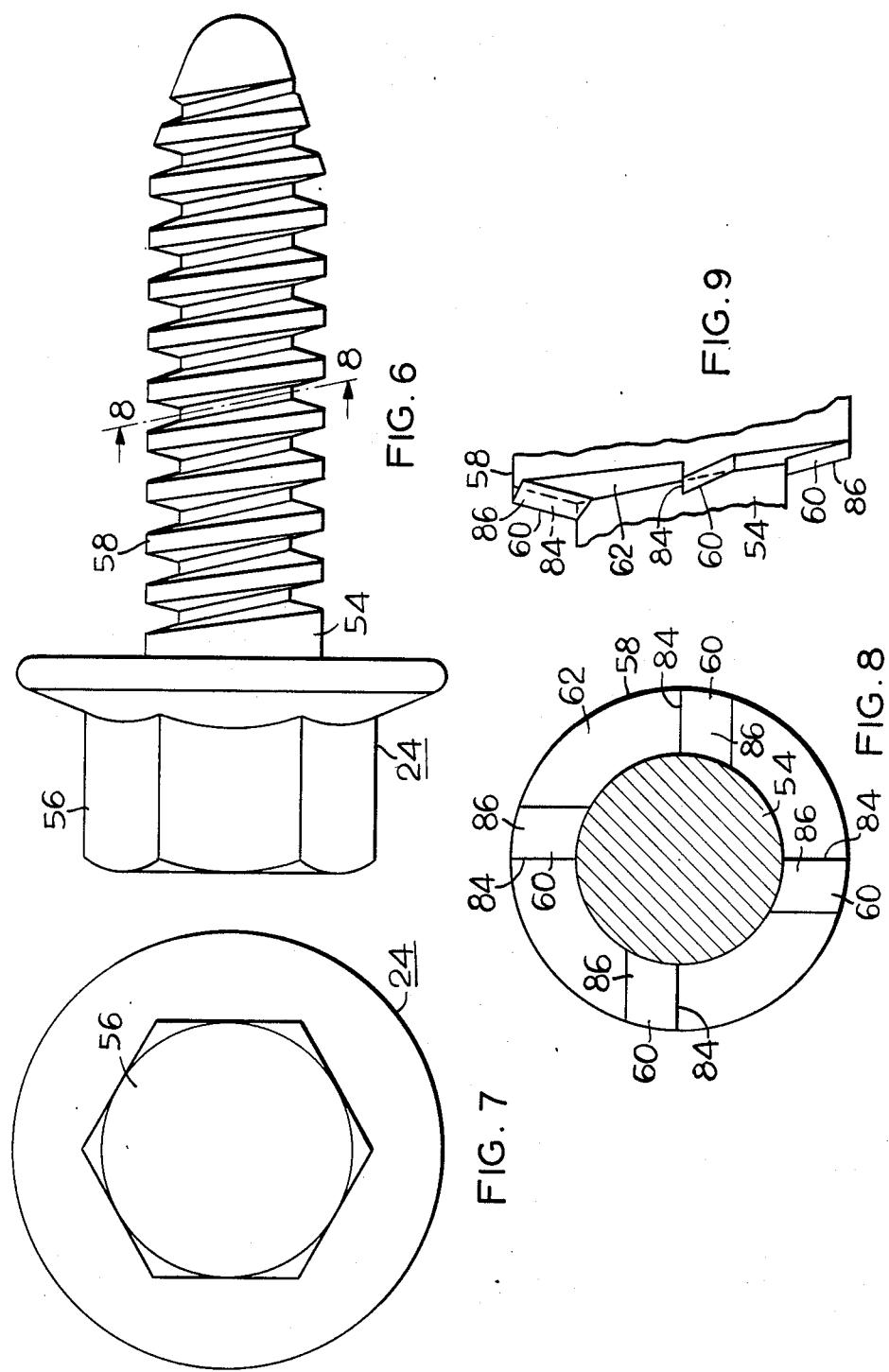

FASTENER WITH PLASTIC U-NUT

SUMMARY OF THE INVENTION

1. Field of Use

This invention relates generally to a two-piece fastener, such as is used to secure two panels together, and which comprises a so-called "U-nut" and a screw.

In particular, it relates to an improved molded plastic U-nut and to an improved molded plastic screw for use therewith.

2. Description of the Prior Art

Two panels, each with preformed panel holes therethrough, can be joined together in face-to-face confronting relationship by inserting a conventional screw through the aligned holes and then attaching a conventional nut to the screw. However, if one panel hole is substantially larger or oversized relative the other, it is difficult to register or "line-up" the holes concentrically, and it may be necessary to use a large diameter nut or a screw with a large diameter head. One practical solution is to use a so-called "U-nut", provided the larger panel hole is relatively close to its panel edge. "U" nuts are also widely used to eliminate the need to have access to both sides of the panels during assembly.

Prior art U-nuts typically take the form of one-piece devices inexpensively manufactured by punching or stamping from resilient sheet metal, such as steel, and then provided with a relatively expensive finish or coating to inhibit rust or corrosion. One type of prior art U-nut comprises two plates, each having a plate hole therethrough, which are integrally and resiliently interconnected along one edge in spaced apart face-to-face relationship and with their plate holes in registry. The edge of one plate hole is bent or fashioned so as to serve as a single thread which is engageable with the thread of a conventional screw, usually metal, rotatably inserted thereinto. In use, the prior art U-nut is slipped over an edge of a primary panel and is shiftably movable so that its plate holes can be aligned with a desired location relative to a preformed oversized hole in the primary panel and a preformed smaller hole in a secondary panel. Then, a conventional screw is inserted through the hole in the secondary panel and screwed into the threaded hole in the U-nut to secure the panels together.

In the automotive and domestic appliance industries two panels to be joined together typically include a sheet metal or plastic primary panel. The sheet metal may have a finish, such as paint or other protective coating. The use of a prior art metal U-nut which has sharp edges and a frangible finish coating, along with a sharp-edged coated metal screw, can create serious problems. For example, the sharp edges of the shiftable U-nut can scratch through the finish of a sheet metal primary panel and expose raw metal therebeneath to rust or corrosion. Or, the sharp edges can scratch the surface of a plastic primary panel and thereby create stress cracks which eventually cause panel failure. Furthermore, metal screws can be torqued down on the metal U-nut with sufficient force to fracture the finish on the U-nut or screw, or both, and subject them to rust and corrosion. It should also be noted that metal and plastic panels have different thermal expansion characteristics, and if such dissimilar panels are joined or clamped together too tightly, as is easily possible with prior art metal U-nuts and metal screws, the plastic panel will tend to ripple under high temperatures. Therefore, lesser clamp loads are desirable to allow the plastic panel to "breath", so to speak, i.e., expand and contract.

SUMMARY OF THE PRESENT INVENTION

In accordance with the present invention there is provided an improved two-piece fastener which is especially well-adapted to secure two members together, such as a primary panel having an oversized preformed panel hole therethrough near an edge thereof and a secondary panel having a preformed panel hole therethrough. The fastener comprises an improved one-piece U-nut formed of plastic by an injection molding process and a screw. The screw may take the form of a conventional metal or plastic screw having a threaded shank and a head. Or, the screw may take the form of an improved screw, preferably formed of plastic by an injection molding process, which has locking teeth on its screw thread engageable with locking teeth in the improved U-nut.

The improved nut comprises two plates, each having a plate hole therethrough, which are integrally and resiliently interconnected along one edge in spaced apart face-to-face relationship and with their plate holes in registry. The free or leading edges of the two plates, which first engage the edge of a primary panel, have sloped surfaces to facilitate attachment of the nut to the panel. One plate supports on its outer side an integrally formed nut shank having an internally threaded bore in registry with the plate holes. One of the plates is provided with locking means to secure the nut to the primary panel. Thus, the other plate supports on its innerside an integrally formed sloped lock portion or tab which is adjacent its associated plate hole. Preferably, the tab is annular in shape and surrounds its plate hole. The bore threads are formed in discrete thread sections arranged on opposite sides of the bore and locking teeth are formed on the undersides of the bore thread sections.

The improved plastic screw comprises a threaded screw shank having a screw head at one end. The screw thread matches the slope and pitch of the bore threads of the nut and has locking teeth formed on the upper side thereof at regular intervals therealong.

In use, the nut is attached to the edge of the primary panel so that its plate holes and shank bore register with the oversized panel hole inward of the primary panel edge. The two panels are then disposed in confronting face-to-face relationship. The threaded screw shank is axially inserted through the hole in the secondary panel and through the plate holes in the U-nut and is rotatably screwed (manually or by a power tool) into the threaded bore of the nut shank, whereby the panels are then secured together. The locking teeth on the upper side of the screw thread and the locking teeth on the undersides of the nut bore thread sections slidably engage and move past each other as the screw is being rotatably inserted in one direction, out the teeth lockingly engage each other and prevent screw removal, if an attempt is made to rotate the screw in the opposite direction.

An improved fastener in accordance with the present invention offers many advantages over the prior art. For example, the plastic components (nut and screw) of the fastener cannot rust or corrode. Therefore, no exotic protective finishes are required thereon, thereby eliminating the cost of the finish itself and the cost of the labor and processes required to apply such finishes.

Colors can be molded in the fastener during manufacture to match those of the panels or other members with which the fastener is to be used. The fastener will not scratch the surface or mar the finish of panels with which it is employed. The plastic of the fastener can be selected to have the same coefficient of expansion as that of a plastic panel used therewith so as to enable the plastic panel to "breathe".

The design and construction of the plastic components of the improved fastener are such that fabrication is kept as simple and economical as possible so that the improved fastener is commercially competitive with prior art stamped metal U-nuts and metal screws therefor. This is accomplished by fabrication of each plastic component in a single injection molding processing step. The design of the fastener and its mold is such as to eliminate the need for any secondary processing operations while in the mold (i.e., unscrewing operations of a mold part used to form threads), or after removal from the mold (i.e., thread-cutting, machining and application of coatings).

The improved U-nut comprises a generally annular, sloped locking tab around one of its plate holes for snuggly engaging the oversized panel hole in the primary panel to prevent the U-nut from slipping off the primary panel prior to screw insertion. Furthermore, the integral thread sections in the nut shank bore are formed so as to have the same pitch and slope as the molded thread on the plastic screw to facilitate screw insertion. In addition, the nut has multiple thread sections disposed along the shank bore which are engageable with the screw thread to provide for greater torque and holding value, as compared to a typical prior art metal U-nut with only one screw-engaging thread.

Corresponding and engageable locking tabs or teeth on the U-nut threads and the screw threads reduce or eliminate any tendency of the components to separate due to vibration of the panels with which they are associated, especially those in motor vehicles which are subjected to prolonged and severe vibration and shock during vehicle operation.

Other objects and advantages of the invention will hereinafter appear.

DRAWINGS

FIG. 6 is a greatly enlarged side elevation view of the screw of FIG. 1;

FIG. 7 is an elevation view of the head of the screw of FIG. 6;

FIG. 8 is a cross-section view of the screw taken on line 8—8 of FIG. 6 and shows locking teeth on the screw thread; and FIG. 9 a side elevation view of the locking teeth of FIG. 8.

DESCRIPTION OF A PREFERRED EMBODIMENT

Figure 1:
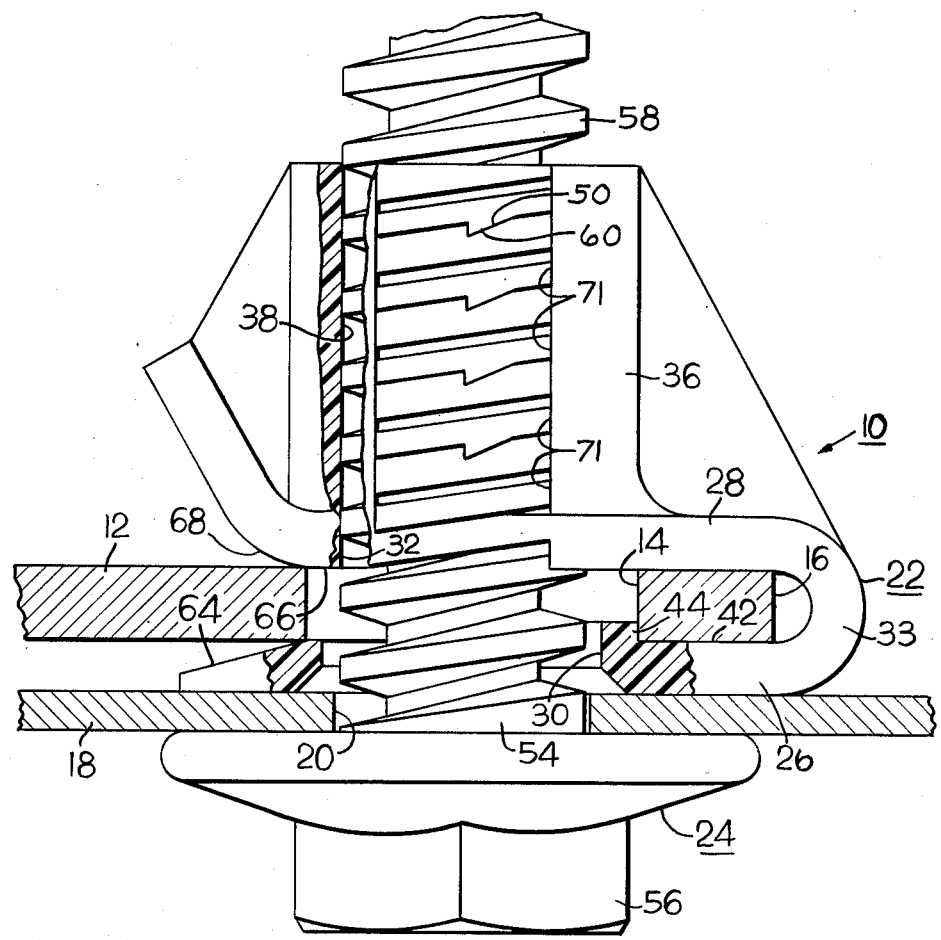
FIG. 1 is a cross-section view of two panels secured together by a fastener in accordance with the invention, which comprises a one-piece plastic U-nut and a plastic screw inserted thereinto.

Referring to FIG. 1, numeral 10 designates a two-piece fastener in accordance with the invention which is shown installed and acting to secure together two members, such as a primary panel 12 and a secondary panel 18. Primary panel 12 has an oversized preformed panel hole 14 therethrough near a panel edge 16 thereof. Secondary panel 18 has a preformed panel hole 20 therethrough. Fastener 10 comprises two components, namely, an improved one-piece plastic U-nut 22 and an improved one-piece plastic screw 24.

As FIGS. 1, 2, 3 and 4 show, U-nut 22 comprises two plates 26 and 28 (the lower and upper plates, respectively, in FIGS. 1 and 2) having circular plate holes 30 and 32, respectively, therethrough. The plates 26 and 28 face or confront each other with their plate holes 30 and 32 in registry with each other and the plates are integrally and resiliently interconnected along one edge in spaced apart relationship by a curved or C-shaped joint 33. Upper plate 28 supports on its outer side 34 an integrally formed nut shank 36 having an internally threaded bore 38 in registry with the plate holes 30 and 32. Two integrally formed external webs 40 and 41 provide support and rigidity for shank 36. Locking means are provided to aid in securing nut 22 on primary panel 12 before screw insertion. Thus, lower plate 26 supports on its inner side 42 an integrally-formed annular-shaped sloped locking member or tab 44 which surrounds its associated plate hole 30. However, a locking member or tab (not shown) could be provided instead on the inner side 66 of upper plate 28 to serve as a locking means. The bore 38 is provided with an internal screw-engaging thread means which is formed in discrete thread sections 46 and 48. Screw locking means in the form of locking teeth, such as tooth 50 (FIG. 5), are formed on the undersides 78 of the bore thread sections 46 and 48 to prevent screw removal, as hereinafter described.

As FIGS. 1, 6, 7, 8 and 9 show, screw 24 comprises a screw shank 54 having a screw head 56 at one end and having a helical screw thread 58 extending axially therealong. Screw thread 58 has a plurality of locking teeth, such as tooth 60, formed on the upper side 62 thereof at intervals therealong. Four teeth 60, spaced 90° apart from one another and slight offset from two perpendicular intersecting planar axes of screw shank 54 (see FIGS. 8 and 9), occupy each 360° wrap of screw thread 58.

As FIG. 1 shows, in use, U-nut 22 is manually attached or clipped to edge 16 of primary panel 12 so that the resiliently interconnected plates 26 and 28 separate sufficiently (compare FIGS. 1 and 2) to accommodate and then resiliently engage opposite surfaces of primary panel 12. Nut 22 is then positioned so that its plate holes 30 and 32 (and thus shank bore 38) register with oversized panel hole 14 disposed inward of panel edge 16. Assuming that panels 12 and 18 are then placed face-to-face, screw 24 is manipulated so that threaded screw shank 54 is axially inserted and extends through hole 20 in secondary panel 18 and through the plate holes 30 and 32 in U-nut 22. Screw 24 is then rotated so that threaded screw shank 54 is rotatably screwed into threaded bore 38 of nut shank 36, whereby the panels 12 and 18 are secured together in confronting face-to-face relationship. As previously explained, screw 24 cannot be rotatably withdrawn from nut 22 without destruction of either or both components.

As FIGS. 7, 8 and 9 make clear, the locking teeth 60 on screw thread 58 and the locking teeth 50 on the nut bore thread sections 46 and 48 slidably engage and move past each other as screw 24 is being inserted by rotation in one direction (i.e., conventional clockwise or right-hand rotation when viewed from the top or head end of the screw). However, the teeth 60 and 50 lockingly engage each other and prevent screw removal if an attempt is made to rotate screw 24 in the opposite direction (i.e., conventional counterclockwise or left-hand rotation when viewed from the top or head end of the screw).

Referring again to FIGS. 1 and 2, the free or leading edge of inner side 42 of lower plate 26 has a tapered or sloped surface 64 and the free or leading edge of inner side 66 of upper plate 28 has an upwardly curved or sloped surface 68. These surfaces 64 and 68 facilitate sliding of U-nut 22 onto edge 16 of primary panel 12 and also effect resilient separation of the plates 26 and 28 to accommodate the primary panel therebetween. The lock portion or tab 44 also slopes downwardly toward the leading edge of inner side 42 and merges with sloped surface 64 and this feature also facilitates installation of U-nut 22 on panel 12, as well as guiding tab 44 into locking or engaging relationship in oversize panel hole 14.

Primary panel hole 14 is circular (but could be some other shape) and is of slightly larger diameter than the outside diameter of annular tab 44 to ensure snug engagement of U-nut 22 on primary panel 12 before screw insertion and the resilient bias of plates 26 and 28 toward each other also aids in this. If primary panel hole 14 is non-circular, tab 44 could be molded to have a complimentary shape other than annular. Secondary panel hole 20 of panel 18 is circular, of smaller diameter than panel hole 14, of slightly larger diameter than the outside diameter of screw thread 58, and of smaller diameter than screw head 56. Secondary panel hole 20 could be other than circular, provided its maximum diameter is less than that of screw head 56.

Referring again to FIGS. 2, 3, 4 and 7, the wall 70 of bore 38 in nut shank 36 is cylindrical, merges into, and is coextensive at its lower end with and of the same diameter as circular plate hole 32 in upper plate 28. Plate hole 30 in lower plate 26 is circular and of slightly larger diameter than the outside diameter of the screw threads 58.

Figure 4:
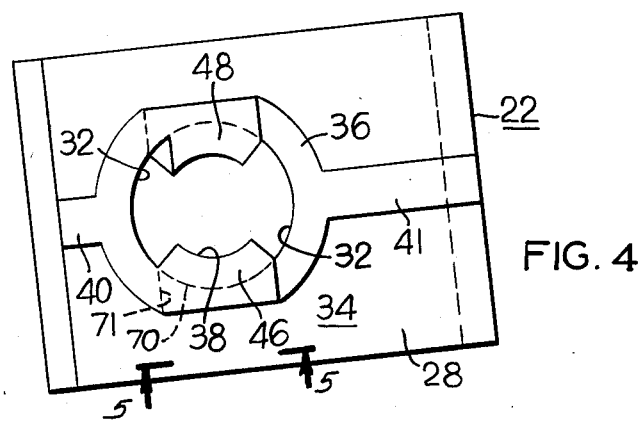
FIG. 4 is a top plan view of the nut of FIG. 2.

As FIGS. 1 and 4 show, nut shank 36 is provided with a series of slots 71 which extend therethrough and communicate with bore 38. The slots 71 are formed by tooling in the mold (not shown) in which U-nut 22 is molded and enable formation of the bore thread sections 46 and 48, but do not play a part in the installation or operation of nut 22.

Figure 3:
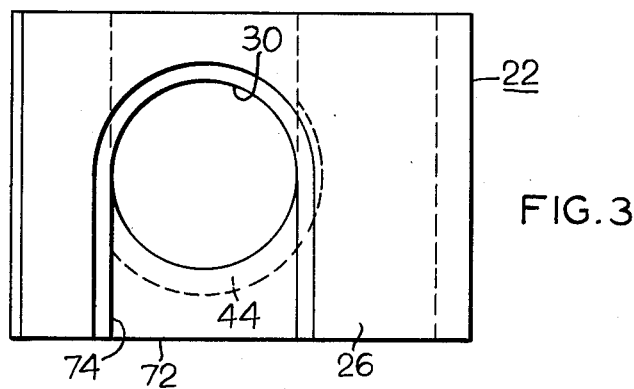
FIG. 3 is a bottom plan view of the nut of FIG. 2.

As FIGS. 3 and 6 show, outer side 72 of lower plate 26 is provided with a groove 74 extending inwardly from an edge of the plate. Groove 74 is also formed by tooling in the mold (not shown) in which U-nut 22 is molded and plays no part in the installation or operation of the U-nut.

Figure 2:
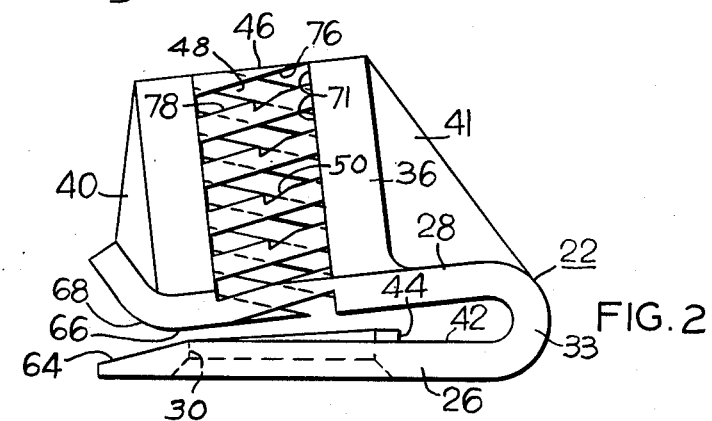
FIG. 2 is a side elevation view in reduced scale of the nut of FIG. 1.
Figure 5:
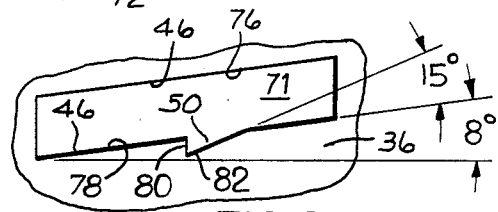
FIG. 5 is a greatly enlarged view taken on line 5—5 of FIG. 4 of a nut thread section and shows a locking tooth thereon.

As FIGS. 1, 2 and 4 show, wall 70 of nut bore 38 is cylindrical and the bore threads therein are formed by the discrete thread sections 46 and 48 which are integrally formed on opposite sides of wall 70. Each thread section 46 and 48 is arcuate in form. The sections 46 are arranged one above another in spaced apart relationship in the axial direction of bore 38. The sections 48 are similarly arranged relative to each other. As FIG. 5 shows, each full thread section 46 comprises a sloped upper surface 76 and a parallel sloped lower surface 78 on which the locking tooth 50 is formed. The thread slope angle is about 8° from a line perpendicular to the axis of bore 38 and matches the slope and dimensions of screw thread 58. As FIG. 2 shows, the thread sections 48 are similar to section 46 but slope in the opposite direction. The previously-mentioned slots 71 are similarly sloped.

As FIG. 5 shows, each tooth 50 on a thread section 46 is triangular in shape and has an end surface 80 parallel to the axis of bore 38 and a flat smooth ramp surface 82 disposed at an angle of about 15° from a line perpendicular to the bore axis. Ramp surface 82 slopes in the same direction as, but at a steeper angle than, sloped lower surface 78 of thread section 46. The tooth 50 on each thread section 48 is similar in construction to that described but, like its associated thread section 48, is reversely disposed relative to a tooth 50 on a thread section 46.

As previously explained, the teeth 50 on the thread sections 46 and 48 cooperate with the locking teeth 60 on screw thread 58 (FIGS. 10 and 11). Each tooth 60 is triangular in shape and has a flat end surface 84 which lies in an axial plane of screw 24 and a flat smooth sloped ramp surface 86 which matches the slope of the ramp surface 82 of the teeth 50.

The thread locking teeth 60 on screw 24 can slide past the thread locking teeth 50 on U-nut 22 as the screw is rotatably inserted into nut bore 38 because the sloped ramp surfaces 86 and 82 permit this. The nut 22 and screw 24, being plastic, facilitate such sliding. But, upon rotation of screw 24 in the opposite (withdrawal) direction (up to less than one-quarter of a turn) causes the end surfaces 80 of the bore teeth 50 and the end surfaces 84 of the screw teeth 60 to interengage and prevent further screw rotation in the opposite direction.

We claim:

1. A one-piece platic nut for use with a screw to secure at least two members, one of which is a panel, together, said screw having teeth integrally formed on a surface of the screw thread, said nut comprising:

a pair of plates, each plate having an inner side and an outer side, having a first edge and a second opposite edge, and having a screw-receiving hole therethrough;

means for integrally interconnecting said plates together at said first edge so that they are disposed in spaced-apart relationship with their inner sides in confronting relationship and with the holes in registry and so that they are resiliently movable toward and away from each other;

a shank integrally connected to one of said plates and projecting outwardly from the outer side thereof, said shank having a bore therethrough defined by a bore wall and in registry with said holes in said plates;

screw-engaging thread means integrally formed on said bore wall and comprising a plurality of pairs of oppositely disposed circumferentially spaced apart thread sections extending toward each other from said bore wall, each thread section being sloped and comprising an upper surface and a lower surface;

integrally formed screw locking teeth on surfaces of at least some of said thread sections for engagement with said teeth on said screw thread to prevent withdrawal of a screw from said bore;

and locking means integrally formed on the inner side of the other of said plates and disposed asdajcent of and partially around the hole in said other plate to locate said nut relative to said one panel.

2. A nut according to claim 1 wherein the inner side of said other plate is provided with a sloped portion along the second edge thereof and adjacent said locking means.

3. A nut according to claim 2 wherein said one plate is provided with a sloped portion along the second edge thereof.

4. A nut according to claim 1 wherein said screw locking teeth are formed on the lower surfaces of said thread sections and wherein said teeth on said screw thread are formed on the upper surface of said screw thread.

5. A two-piece fastener to secure at least two members together comprising:
   a one-piece platic nut and a screw for insertion into said nut;
   said nut comprising:
   a pair plates,
   each plate having an inner side and an outer side, having a first edge and a second opposite edge, and having a screw-receiving hole therethrough;
   means for integrally interconnecting said plates together at said first edge so that they are disposed in sapced-apart relationship with their inner sides in confronting relationship and with the holes in registry and so that they are resiliently movable toward and away from each other;
   a shank integrally connected to one of said plates and projecting outwardly from the outer side thereof,
   said shank having a screw-receiving bore therethrough defined by a bore wall and in registry with said holes in said plates;
   screw-engaging thread means integrally formed on said bore wall, said screw-engaging thread means comprising a plurality of pairs of oppositely disposed circumferentially spaced apart sloped thread sections extending toward each other from said bore wall, each thread section having an upper and lower surface;
   screw locking means to prevent withdrawal of said screw from said bore and comprising at least one tooth integrally formed on the lower surface of at least one of said thread sections;
   a locking means integrally formed on the inner side of the other of said plates, said locking means being diposed adjacent and partially around the hole in said other plate and having a surface which slopes downwardly toward the second edge of said other plate;
   said screw comprising:
   a screw shank;
   a screw thread integrally formed on said screw shank and having upper and lower surfaces;
   a screw head at one end of said screw shank;
   and at least one tooth integrally formed on said upper surface of said screw thread engageable with said tooth on said thread sections in said nut bore.

6. A nut according to claim 5 wherein the inner side of said other plate is provided with a sloped portion along the second edge thereof and adjacent said locking means.

7. In combination:
   a primary panel having an outer edge and having a primary hole therethrough spaced inwardly of said outer edge;
   a secondary panel spaced from said primary panel and having a secondary hole therethrough in registry with said primary hole;
   each hole having a circumferential edge;
   a molded plastic nut attached to said primary panel, said nut comprising:
   a panel gripping portion which said primary panel is engaged and comprising a first plate engaged with a side of said primary panel closest to asid secondary panel, and a second plate engaged with a side of said primary panel furthest from said secondary panel, the first and second plates being relatively movable and integrally connected to each other at one edge, each plate having a screw-receivinv hole therethrough;
   locking means integral with said first plate of said gripping portion on a side thereof closest to said primary panel and extending into said primary hole in said primary panel;
   a shank portion integral with said second plate and disposed on a side thereof furthest from said secondary panel, said shank portion having a screw-receving bore extending therethrough defined by a bore wall,
   screw-engaging thread means integrally formed on said bore wall, said screw-engaging thread means comprising a plurality of pairs of oppositely disposed circumferentially spaced apart sloped thread sections extending toward each other from said bore wall, each thread section having an upper and lower surface;
   screw locking means to prevent withdrawal of said screw from said bore and comprising at least one tooth integrally formed on the lower surface of at least one of said thread sections;
   and a screw having a screw shank extending through said secondary hole in said secondary panel and into said screw-receiving bore said screw shank having a screw thread in threaded engagement with said thread means in said bore, said screw having a head engaged with a side of said secondary panel furthest from said primary panel, said screw locking means further comprising at least one tooth integrally formed on the upper surface of said screw thread and engageable with said tooth on said thread portion in said screw receiving bore.

* * * * *